US012306447B2

(12) United States Patent
Hurley et al.

(10) Patent No.: US 12,306,447 B2
(45) Date of Patent: May 20, 2025

(54) JUMPER CABLES WITH HIGH TENSILE PERFORMANCE AND LOW ACIDITY

(71) Applicant: Corning Research & Development Corporation, Corning, NY (US)

(72) Inventors: William Carl Hurley, Hickory, NC (US); Martina Petra Richter-Bühling, Neustadt bei Coburg (DE)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 234 days.

(21) Appl. No.: 17/994,506

(22) Filed: Nov. 28, 2022

(65) Prior Publication Data

US 2023/0168444 A1 Jun. 1, 2023

Related U.S. Application Data

(60) Provisional application No. 63/284,241, filed on Nov. 30, 2021.

(51) Int. Cl.
*G02B 6/44* (2006.01)
*G02B 6/38* (2006.01)

(52) U.S. Cl.
CPC .................. *G02B 6/3897* (2013.01)

(58) Field of Classification Search
CPC ............................ G02B 6/4432; G02B 6/4433
See application file for complete search history.

(56) References Cited

U.S. PATENT DOCUMENTS

| | | | |
|---|---|---|---|
| 7,539,380 B1 | 5/2009 | Abernathy et al. | |
| 10,444,460 B2* | 10/2019 | Scarpaci | G02B 6/3893 |
| 2009/0087148 A1 | 4/2009 | Bradley et al. | |
| 2022/0155542 A1 | 5/2022 | Heinz et al. | |
| 2023/0185042 A1* | 6/2023 | Hurley | G02B 6/4432 |
| | | | 385/100 |

FOREIGN PATENT DOCUMENTS

| | | |
|---|---|---|
| EP | 3764144 A1 | 1/2021 |
| JP | 10-010380 A | 1/1998 |

OTHER PUBLICATIONS

"Standard for Indoor Optical Fiber Cable ANSI/ICEA S83-596-2016", Jan. 1, 2016 (Jan. 1, 2016), Insulated Cable Engineers Association, 66 pages.
European Patent Application No. 22209355.1, Extended European Search Report dated May 9, 2023; 9 pages; European Patent Office.

* cited by examiner

Primary Examiner — Omar R Rojas
(74) Attorney, Agent, or Firm — Thomas R. Irwin

(57) ABSTRACT

An optical fiber cable is provided. The optical fiber cable includes an outer jacket having an outer surface defining an outermost surface of the optical fiber cable and an inner surface defining a central bore. The optical fiber cable includes a plurality of aramid fibers located in the central bore, and the plurality of aramid fibers have a relatively low total linear density. The optical fiber cable includes at least one optical fiber located within the central bore, and the at least one optical fiber has a proof test of greater than 100 kpsi.

15 Claims, 6 Drawing Sheets

| TENSILE OPTIMIZED | | | | | | | | | | | | TENSILE-ARAMID ONLY | 2% | 6% |
|---|---|---|---|---|---|---|---|---|---|---|---|---|---|---|
| | MATERIAL 1 | MATERIAL 2 | MATERIAL 3 | NUMBER | WEIGHT [KG/LM] | PH VALUE | CONDUCTIVITY ($\mu$S/MM) | MATERIAL 4 | TOTAL PH VALUE WEIGHT | TOTAL CONDUCTIVITY WEIGHTED | ACIDITY RATING | MATERIAL | ELONGATION N/% | RESIDUAL LOAD [N] | SHORT LOAD [N] |
| 5x890 DTEX K49 | FIBER | 2Y141 | ARAMID 890 | 5 | 0,45 | 6,6 | 17,4 | MECOLINE TP 1039 | 5,1 | 2,36 | A1 | ARAMID 890 | 7,14 | 71N | 214 N |
| 1680 DTEX K49 | FIBER | 2Y141 | ARAMID 1580/1610 | 3 | 0,48 | 6,6 | 17,4 | MECOLINE TP 1039 | 5,1 | 2,49 | A2 | ARAMID 1580/1610 | 11,1 | 67N | 200 N |
| 422 DTEX K49 | FIBER | 2Y141 | ARAMID 422 | 10 | 0,42 | 6,6 | 17,4 | MECOLINE TP 1039 | 5,1 | 2,26 | A1 | ARAMID 422 | 3,6 | 72N | 216 N |
| 440 DTEX K29 | FIBER | 2Y141 | ARAMID 440 | 12 | 0,53 | 6,6 | 17,4 | MECOLINE TP 1039 | 5,1 | 2,66 | A2 | ARAMID 440 | 2,9 | 70N | 209 N |
| 840 DTEX | FIBER | 2Y141 | ARAMID 840 | 8 | 0,67 | 6,6 | 17,4 | MECOLINE TP 1039 | 5,1 | 3,15 | A2 | ARAMID 840 | 4,4 | 70N | 211 N |
| 800 DTEX DURING QUALI | FIBER | 2Y141 | N_ARAMID 800 | 8 | 0,64 | 6,6 | 17,4 | MECOLINE TP 1039 | 5,1 | 3,04 | A2 | N_ARAMID 800 | 4,4 | 70N | 211 N |
| 840 DTEX DURING QUALI | FIBER | 2Y141 | N_ARAMID 930 | 6 | 0,56 | 6,6 | 17,4 | MECOLINE TP 1039 | 5,1 | 2,76 | A2 | N_ARAMID 930 | 5,9 | 71N | 212 N |

| | | | | | | |
|---|---|---|---|---|---|---|
| 100KPSI | PERMAMENT | 700 | MPA | = | 1 | % | FIBER STRAIN |
| | SHORT | 140 | MPA | = | 1,2 | % | FIBER STRAIN |
| | | 420 | MPA | = | 0,6 | % | FIBER STRAIN |
| 200KPSI | PERMAMENT | 224 | MPA | = | 0,32 | % | FIBER STRAIN |
| | SHORT | 875 | MPA | = | 1,25 | % | FIBER STRAIN |

FIG. 4

| TENSILE OPTIMIZED | | | | | | | | | | | TENSILE-ARAMID ONLY | | | |
|---|---|---|---|---|---|---|---|---|---|---|---|---|---|---|
| | MATERIAL 1 | MATERIAL 2 | MATERIAL 3 | NUMBER | WEIGHT [KG/LM] | PH VALUE | CONDUCTIVITY (μS/mm) | MATERIAL 4 | TOTAL PH VALUE WEIGHT WEIGHTED | TOTAL CONDUCTIVITY WEIGHTED | ACIDITY RATING | MATERIAL | ELONGATION N/% | 2% RESIDUAL LOAD [N] | 6% SHORT LOAD [N] |
| 5x890 DTEX K49 | FIBER | 2Y141 | ARAMID 890 | 5 | 0,45 | 6,6 | 17,4 | MECOLINE TP 1039 | 5,1 | 2,36 | A1 | ARAMID 890 | 7,14 | 71N | 214 N |
| 1680 DTEX K49 | FIBER | 2Y141 | ARAMID 1580/1610 | 3 | 0,48 | 6,6 | 17,4 | MECOLINE TP 1039 | 5,1 | 2,49 | A2 | ARAMID 1580/1610 | 11,1 | 67N | 200 N |
| 422 DTEX K49 | FIBER | 2Y141 | ARAMID 422 | 10 | 0,42 | 6,6 | 17,4 | MECOLINE TP 1039 | 5,1 | 2,26 | A1 | ARAMID 422 | 3,6 | 72N | 216 N |
| 440 DTEX K29 | FIBER | 2Y141 | ARAMID 440 | 12 | 0,53 | 6,6 | 17,4 | MECOLINE TP 1039 | 5,1 | 2,66 | A2 | ARAMID 440 | 2,9 | 70N | 209 N |
| 840 DTEX | FIBER | 2Y141 | ARAMID 840 | 8 | 0,67 | 6,6 | 17,4 | MECOLINE TP 1039 | 5,1 | 3,15 | A2 | ARAMID 840 | 4,4 | 70N | 211 N |
| 800 DTEX DURING QUALI | FIBER | 2Y141 | N_ARAMID 800 | 8 | 0,64 | 6,6 | 17,4 | MECOLINE TP 1039 | 5,1 | 3,04 | A2 | N_ARAMID 800 | 4,4 | 70N | 211 N |
| 840 DTEX DURING QUALI | FIBER | 2Y141 | N_ARAMID 930 | 6 | 0,56 | 6,6 | 17,4 | MECOLINE TP 1039 | 5,1 | 2,76 | A2 | N_ARAMID 930 | 5,9 | 71N | 212 N |

FIG. 6

| ACIDITY OPTIMIZED | MATERIAL 1 | MATERIAL 2 | MATERIAL 3 | NUMBER | WEIGHT [KG/LM] | PH VALUE | CONDUCTIVITY (μS/MM) | MATERIAL 4 | TOTAL PH VALUE WEIGHT WEIGHTED | TOTAL CONDUCTIVITY WEIGHTED | ACIDITY RATING | TENSILE MATERIAL | 100KPSI ELONGATION N/% | 2% RESIDUAL LOAD [N] | 6% SHORT LOAD [N] |
|---|---|---|---|---|---|---|---|---|---|---|---|---|---|---|---|
| 5x890 DTEX K49 | FIBER | 2Y141 | ARAMID 890 | 5 | 0,45 | 6,6 | 17,4 | MECOLINE TP 1039 | 5,1 | 2,36 | A1 | ARAMID 890 | 7,14 | 71N | 214 N |
| 1680 DTEX K49 | FIBER | 2Y141 | ARAMID 1580/1610 | 3 | 0,32 | 6,6 | 17,4 | MECOLINE TP 1039 | 5,1 | 1,89 | A1 | ARAMID 1580/1610 | 11,1 | 44N | 133 N |
| 422 DTEX K49 | FIBER | 2Y141 | ARAMID 422 | 10 | 0,42 | 6,6 | 17,4 | MECOLINE TP 1039 | 5,1 | 2,26 | A1 | ARAMID 422 | 3,6 | 72N | 216 N |
| 440 DTEX K29 | FIBER | 2Y141 | ARAMID 440 | 12 | 0,44 | 6,6 | 17,4 | MECOLINE TP 1039 | 5,1 | 2,34 | A1 | ARAMID 440 | 2,9 | 58N | 174 N |
| 840 DTEX | FIBER | 2Y141 | ARAMID 840 | 8 | 0,42 | 6,6 | 17,4 | MECOLINE TP 1039 | 5,1 | 2,26 | A1 | ARAMID 840 | 4,4 | 44N | 132 N |
| 800 DTEX DURING QUALI | FIBER | 2Y141 | N_ARAMID 800 | 8 | 0,40 | 6,6 | 17,4 | MECOLINE TP 1039 | 5,1 | 2,19 | A1 | N_ARAMID 800 | 4,4 | 44N | 132 N |
| 840 DTEX DURING QUALI | FIBER | 2Y141 | N_ARAMID 930 | 6 | 0,37 | 6,6 | 17,4 | MECOLINE TP 1039 | 5,1 | 2,08 | A1 | N_ARAMID 930 | 5,9 | 47N | 142 N |

FIG. 7

| ACIDITY OPTIMIZED | MATERIAL 3 | NUMBER | TOTAL CONDUCTIVITY WEIGHTED | RATING | | TENSILE | | | | | | | | |
|---|---|---|---|---|---|---|---|---|---|---|---|---|---|---|
| | | | | | | MATERIAL | 100KPSI ELONGATION N/% | 2% RESIDUAL LOAD [N] | 6% SHORT LOAD [N] | | 200KPSI ELONGATION N/% | 3,2% RESIDUAL LOAD [N] | 12,5% SHORT LOAD [N] | |
| 5x890 DTEX K49 | ARAMID 890 | 5 | 2,36 | A1 | | ARAMID 890 | 7,14 | 71N | 214 N | | 7,14 | 114N | 446 N | |
| 1680 DTEX K49 | ARAMID 1580/1610 | 2 | 1,89 | A1 | | ARAMID 1580/1610 | 11,1 | 44N | 133 N | | 11,1 | 71N | 278 N | |
| 422 DTEX K49 | ARAMID 422 | 10 | 2,26 | A1 | | ARAMID 422 | 3,6 | 72N | 216 N | | 3,6 | 115N | 450 N | |
| 440 DTEX K29 | ARAMID 440 | 10 | 2,34 | A1 | | ARAMID 440 | 2,9 | 58N | 174 N | | 2,9 | 93N | 363 N | |
| 840 DTEX | ARAMID 840 | 5 | 2,26 | A1 | | ARAMID 840 | 4,4 | 44N | 132 N | | 4,4 | 70N | 275 N | |
| 800 DTEX DURING QUALI | N_ARAMID 800 | 5 | 2,19 | A1 | | N_ARAMID 800 | 4,4 | 44N | 132 N | | 4,4 | 70N | 275 N | |
| 840 DTEX DURING QUALI | N_ARAMID 930 | 4 | 2,08 | A1 | | N_ARAMID 930 | 5,9 | 47N | 142 N | | 5,9 | 76N | 295 N | |

FIG. 8

JUMPER CABLES WITH HIGH TENSILE PERFORMANCE AND LOW ACIDITY

PRIORITY APPLICATION

This application claims the benefit of priority of U.S. Provisional Application No. 63/284,241, filed on Nov. 30, 2021, the content of which is relied upon and incorporated herein by reference in its entirety.

BACKGROUND

The disclosure relates generally to optical fiber cables and more particularly to optical fiber jumper cables having high tensile strength performance and low levels of aramid fibers. Optical cables have seen increased use in a wide variety of fields including various electronics and telecommunications fields. Optical cables contain or surround one or more optical fibers. The cable provides structure and protection for the optical fibers within the cable.

SUMMARY

One embodiment of the disclosure relates to an optical fiber jumper cable. The optical fiber jumper cable includes an outer jacket having an outer surface defining an outermost surface of the optical fiber cable and an inner surface defining a central bore. A plurality of aramid fibers are located in the central bore, wherein the plurality of aramid fibers have a relatively low total linear density such that the cable has an a1 acidity during burn as measured by EN 50267-2-3. At least one optical fiber is located within the central bore and surrounded by the aramid fibers, wherein the at least one optical fiber has a proof test of 200 kpsi or greater and experiences less than or equal to 0.5% permanent fiber strain when exposed to a permanent tensile load of 100 N. At least one connector may be provided on an end of the cable.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

BRIEF DESCRIPTION OF THE DRAWINGS

FIG. 4 shows the degree of fiber strain experienced by a 100 kpsi and 200 kpsi optical fibers at two different short term and two different permanent tensile load levels.

FIG. 6 is a table of optical fiber cable examples wherein the cables have 100 kpsi optical fibers and are configured to meet tensile requirements.

FIG. 7 is a table of optical fiber cable examples wherein the cables have 100 kpsi optical fibers and are configured to meet acidity burn rating requirements.

FIG. 8 is a table of optical fiber cable examples wherein the cables have 200 kpsi optical fibers and meet both the tensile and acidity burn rating requirements.

DETAILED DESCRIPTION

Figure 1:
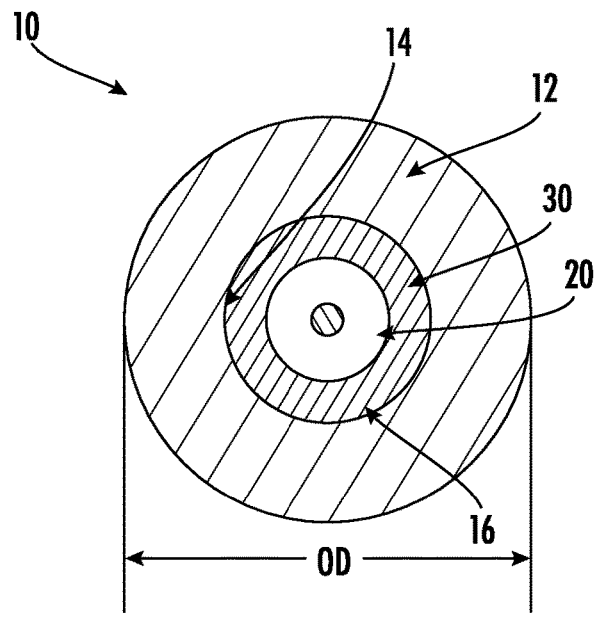
FIGS. 1-3 are cross-sectional views of an exemplary optical fiber jumper cable, in accordance with aspects of the present disclosure.

Referring generally to the figures and description below, various embodiments of optical fiber cables having high tensile strength performance and relatively low levels of aramid fiber are provided. Fiber optic cable designs typically have to strike a balance between a number of competing and often opposing design considerations. The optical fiber cable discussed herein utilizes an innovative design to provide a sufficiently low level of conductivity in the acid gas burn test, a small cable size for duct installation and a high tensile strength with acceptable fiber strain, both for short and long term tensile load performance.

Conventional cable designs typically look toward use of various strength elements, for example, steel/metal strength members and/or large amounts of aramid fiber, to provide high tensile strength. However, Applicant has determined that increased levels of aramid fiber to provide tensile and fiber strain performance also tends to yield a fiber optic cable that has relatively high levels of conductivity in the acid gas burn test, and use of other non-aramid strength members (e.g., metal wire, glass yarns, high molecular weight polymer material, etc.) cause other design deficiencies, such as need from grounding, increased expenses, lower flexibility, higher weight, etc.

Thus, Applicant has designed a cable that utilizes low levels of aramid strength fibers within a relatively small jacket and that includes high proof test optical fibers (e.g., 200 kpsi proof test optical fibers) that provides for the unique combination of low level of conductivity in the acid gas burn test, small cable size and a high tensile strength with acceptable fiber strain, both for short and long term performance.

Essentially all optical fiber used today in commercial fiber optic cable is 100 kpsi proof tested fiber. Due to lower yields from the optical fiber manufacturing process, utilizing 200 kpsi proof tested fiber is conventionally understood to be inefficient/too expensive and unnecessary, as 100 kpsi proof tested fiber has typically sufficient strain performance in typical cable designs. Despite this conventional cable design understanding, Applicant has developed a cable design that utilizes the higher strain performance of proof tested optical fibers greater than 100 kpsi, including 200 kpsi proof tested fibers, in combination with a small cable diameter and relatively low levels of aramid to provide a cable with the performance and size discussed herein, a combination of which Applicant believes to be unachievable using conventional 100 kpsi proof tested fibers.

As background regarding proof testing of optical fibers, the tensile strength of most materials is determined by the load at which the material breaks. In contrast, the tensile strength of an optical cable is determined by the reliability of the optical fibers, which depends on the time-stress history of the optical fibers. Optical fibers go through a proof test during manufacturing that determines the amount of stress that the fiber can experience during installation and operation with low probability of a fiber break during the lifetime of the cable. Cable standards such as ICEA-596 or GR-409 specify a limit on the allowed fiber strain during installation and operation of the cable based on the maximum fiber strain during the proof test. Following these guidelines will ensure less than one fiber break per million meters of fiber over a 20 year life of the cable. The typical proof test, to which more than 99.999% of all optical fibers are tested, is 100 kpsi. As compared to 100 kpsi fiber, 200 kpsi fiber can withstand double the tensile load with the same failure rate as 100 kpsi fiber. However, because this failure rate is a function of flaws in the glass of the optical fiber formed during the manufacturing process, a smaller percentage of fiber will pass a 200 kpsi proof test, and thus conventional cable designs have not recognized a need/benefit of accepting the lower yields and increased expense associated with use of 200 kpsi fiber. Thus, the cable designs discussed herein buck conventional cable design thinking by utilizing 200 kpsi optical fiber to achieve high tensile performance and low conductivity in in the acid gas burn test.

Figure 2:
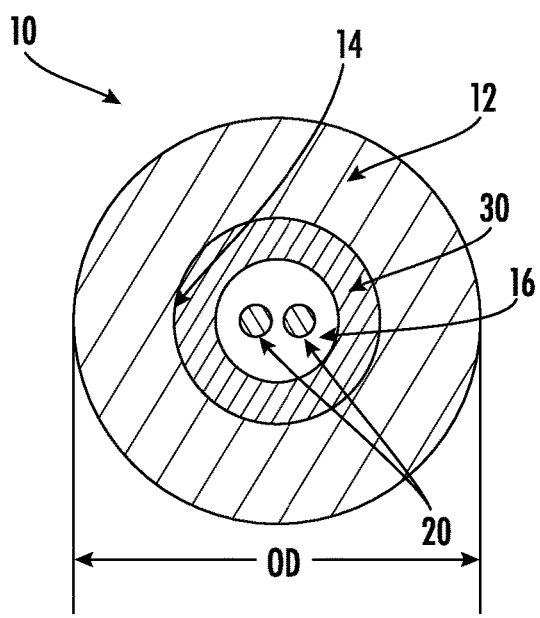
Figure 3:
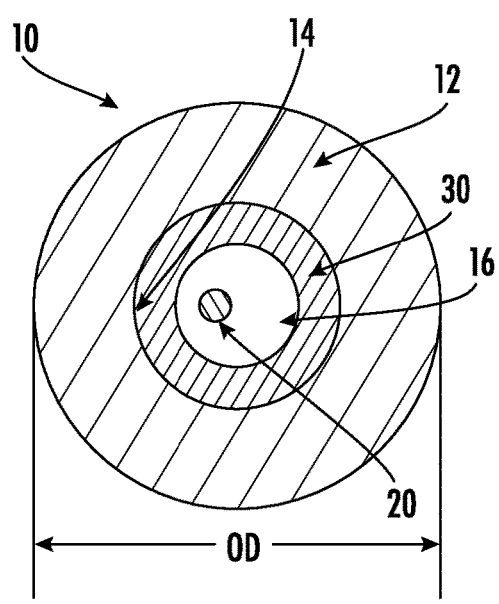

Referring to FIGS. 1-3, a cross-sectional view of an optical fiber jumper cable is shown as cable 10, according to aspects of the present disclosure. Cable 10 includes an outer cable jacket or layer, shown as outer jacket 12. Cable jacket 12 has an inner surface 14 that defines a central bore 16. As will be generally understood, inner surface 14 of outer jacket 12 defines an internal area or region within which various cable components may be located.

Located within central bore 16 is at least one optical fiber 20, which may be a 900 μm tight-buffered optical fiber, as shown in FIG. 1 for example, having an optical fiber core, a cladding surrounding the optical fiber core, a coating surrounding the cladding, and a first tight buffer surrounding and in contact with the first coating. As shown in FIGS. 2 and 3, the optical fiber 20 may also be any single-mode, multi-mode, or multi-core optical fiber or plurality of optical fibers. Cable 10 includes one or more aramid fibers, shown as a plurality of aramid fibers, forming aramid fiber layer 30 located within central bore 16. Aramid fiber layer 30 is located in the region between an outer surface of the optical fiber 20 and inner surface 14 of outer jacket 12.

In general, cable 10 is designed to provide a unique and innovative combination of cable performance characteristics. In particular, cable 10 has sufficiently low level of conductivity as measured by the acid gas burn test (e.g., measured by EN 50267-2-3), a small cable size for duct installation (e.g., a cable outside diameter (OD) of between 1.0 and 3.0 millimeters, preferably between 1.2 and 2.8 millimeters), and a high tensile strength with acceptable fiber strain, both for short and long term performance. Conventional cable designs typically look toward use of steel/metal strength members and/or large amounts of aramid fiber to provide high tensile strength. As discussed herein, cable 10 utilizes a relatively low amount of aramid strength fiber (providing, at least in part, the low conductivity in the acid gas burn test) while still providing high tensile/strain fiber performance by using optical fibers 20 having higher proof test ratings than conventional cables.

In specific embodiments, cable 10 includes a relatively low level of aramid fiber (despite high tensile/strain performance discussed below) such that the total linear density of all aramid fibers 30 within central bore 16 is less than 10,000 dtex. In specific embodiments, the total linear density of all aramid fibers 30 within central bore 16 is between 3,000 and 7,000 dtex, more specifically is between 4000 dtex and 6000 dtex, and even more specifically between 4500 dtex and 5500 dtex. Applicant has identified that aramid fibers are a substantial contributor to conductivity/acidity during acid gas burn tests, and thus by lowering the amount of aramid fibers, improved acid gas burn test performance can be provided.

Applicant has further discovered that these low levels of aramid fibers can be used while still providing high tensile/strain performance by utilizing optical fibers 20 that have high proof test levels. In specific embodiments, optical fibers 20 have a proof test greater than 100 kpsi. In a specific embodiment, optical fibers 20 have a proof test equal to or greater than 200 kpsi. In an even more specific embodiment, optical fibers 20 have a proof test of 200 kpsi. In specific embodiments, proof testing of optical fibers as discussed herein are conducted as specified in cable standards such as ICEA-596 or GR-409, which specify a limit on the allowed fiber strain during installation and operation of the cable based on the maximum fiber strain during the proof test. Thus, in comparison to conventional fiber optic cables that utilize 100 kpsi optical fibers, Applicant has identified an improved functional advantage for using high proof test optical fibers combined with low levels of aramid fibers to provide a cable with low acidity burn test performance and high tensile/strain performance, despite the increased cost of using higher proof test fibers.

By using the high proof test optical fibers discussed herein, cable 10 has high tensile strength/strain performance despite low amounts of aramid and without relying on other non-aramid strength members, such as metal wires, glass yarns, glass reinforced plastic rods, high molecular weight polymer strength components, etc. In various embodiments of cable 10 discussed herein, optical fibers 20 experience less than or equal to 1.5% short term fiber strain when exposed to a short term tensile load of 400 N. In specific embodiments, optical fibers 20 experience less than or equal to 1.3% short term fiber strain, specifically 1.2% to 1.3% short term fiber strain and even more specifically 1.25% short term fiber strain, when exposed to a short term tensile load of 400 N.

Similarly, the cable designs discussed herein provide high levels of long term (permanent) tensile strength/strain performance. In various embodiments cable 10, discussed herein, optical fibers 20 experience less than or equal to 0.5% permanent fiber strain when exposed to a permanent tensile load of 100 N. In specific embodiments, optical fibers 20 experience less than or equal to 0.4% permanent fiber strain, specifically 0.3% to 0.4% permanent fiber strain and even more specifically 0.32% permanent fiber strain, when exposed to a permanent tensile load of 100 N. Permanent and short-term fiber strain as discussed herein can be measured as set forth in the relevant standards.

It should be noted that in these designs, the tensile/strain performance characteristics are provided with low levels of aramid and in which there are no non-aramid strength members (e.g., no metal or glass yarn strength members) located within central bore 16 of outer jacket 12 or embedded within outer jacket 12. In these designs, the low levels of aramid combined with the high proof test fibers provide both good burn performance and the strain performance noted above. As such, in various embodiments, cable 10 has an a1 acidity rating during burn as measured by EN 50267-2-3. Similarly, in various embodiments, cable 10 has a conductivity of less than <2.5 μS/mm during burn as measured by EN 50267-2-3.

In addition, cable 10 provides the performance characteristics discussed above (e.g., tensile strength/strain characteristics and conductivity/acid burn performance) while also providing a relatively small and compact cable size. In specific embodiments, the maximum outer dimension, shown as the outer diameter (OD) of the circular shaped cable 10, is less than 3 mm, and specifically is between 1.2 and 2.8 mm.

In general, outer jacket 12 may be made from a variety of polymer materials typically used in cable constructions. However, in specific embodiments, to further provide for burn performance, polymer materials of outer jacket 12 are a fire-resistant, non-corrosive polymer material. In specific embodiments, outer jacket 12 is formed from a low smoke, zero halogen (LSZH) or flame retardant, non-corrosive (FRNC) composition. In certain embodiments, outer jacket 12 is formed from a polymer material including a flame retardant additive dispersed, mixed, or otherwise distributed in a polymeric material. In various embodiments, the polymeric material is a thermoplastic, and in a more specific embodiment, the thermoplastic is a polyolefin-based material. Polymer materials that may be used for outer jacket 12 include a single polymer or a blend of polymers selected from the following non-limiting list: ethylene-vinyl acetate copolymers, ethylene-acrylate copolymers, ethylene homopolymers (including but not limited to low density, medium density, and high density), linear low density polyethylene, very low density polyethylene, polyolefin elastomer copolymer, propylene homopolymer, polyethylene-polypropylene copolymer, butene- and octene branched copolymers, polyester copolymers, polyethylene terephthalates, polybutylene therephthalates, other polymeric terephthalates, and maleic anhydride-grafted versions of the polymers listed herein. As mentioned, outer jacket 12 may include at least one flame retardant additive. Exemplary flame retardant additives include aluminum trihydrate (ATH), magnesium hydroxide (MDH), ammonium polyphosphate (APP), pentaerythritol (PER), antimony oxides, zinc borates, boehmite, intumescent materials, and red phosphorous, among others.

In various embodiments, the polymer material of outer jacket 12 is a fire-resistant, non-corrosive polymer material having one or more of the following properties: a polyolefin base resin, metal oxide fire retardant(s), limiting oxygen index (LOI) greater than 40 and/or specific gravity greater than 1.50. In various embodiments, the polymer material of outer jacket 12 is a fire-resistant material having one or more of the following properties: a PVC base resin, metal oxide fire retardant(s), Limiting Oxygen Index (LOI) greater than 48 and/or a specific gravity greater than 1.55.

In various embodiments, optical fibers 20 discussed herein include optical fibers that are flexible, transparent optical fibers made of glass. The fibers function as a waveguide to transmit light between the two ends of the optical fiber. Optical fibers include a transparent glass core surrounded by a transparent cladding material with a lower index of refraction. Light is kept in the core by total internal reflection. Glass optical fibers may comprise silica, but some other materials such as fluorozirconate, fluoroaluminate and chalcogenide glasses, as well as crystalline materials such as sapphire, may be used. The light is guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber. In various embodiments, the optical fibers may be bend insensitive optical fibers or multi-core optical fibers.

In a telecommunications system that uses optical fibers, there are typically many locations where fiber optic cables that carry the optical fibers connect to equipment or other fiber optic cables. To conveniently provide these connections, fiber optic connectors ("connectors") are often provided on the ends of fiber optic cable 10. Many different types of fiber optic connectors exist, and may be used for mating with equipment or other connectors. Tensile strength members of fiber optic cables may be mechanically coupled with portions of fiber optic connectors to prevent optical fibers from bearing tensile loads applied to fiber optic cables. Optic connectors on one or both ends of cable 10 may be LC connector or SC connector types, for example, but any suitable types of connectors may be used, either in simplex form (embodying separate connectors for each fiber) or in duplex form (including one connector for two fibers, for example). In certain embodiments, the fiber optic cable 10 comprises a pre-connectorized jumper cable having a length of less than 10 m, less than 5 m, or less than 3 m.

Figure 5:
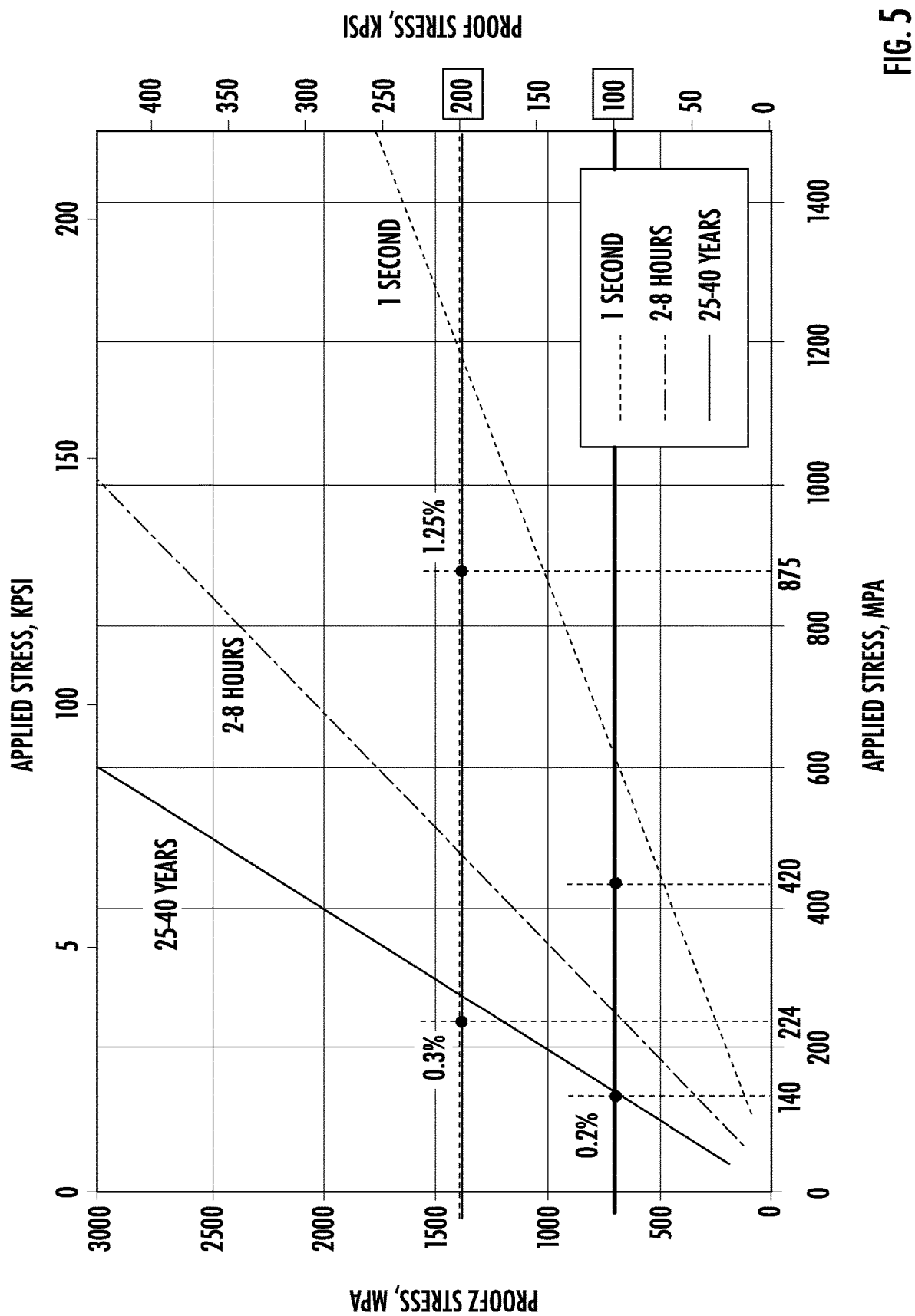
FIG. 5 is a chart showing the strain performance of optical fibers at different proof stress levels.

Referring to FIGS. 4-5, details of the tensile performance and fiber stress calculation is provided. In general, the 100 kpsi (0.7 GPa) proof test is equivalent to ~1% fiber strain or ~8 N. The calculation of tensile load by using 100 kpsi fiber is based on following design parameters: fiber strain for residual load=0.2% fiber strain (=140 MPa) and for maximum load=0.6% fiber strain (=420 MPa). The calculation of tensile load by using 200 kpsi fiber is based on following design parameters: fiber strain for residual load=0.32% fiber strain (=224 MPa) and for maximum load=1.25% fiber strain (=875 MPa).

Referring to FIG. 4, the above noted design parameters for 100 and 200 kpsi fibers was verified using the model described in Scott Glaeseman, "Optical Fiber Mechanical Reliability," FIG. 63, p. 57. Thus, FIG. 4 shows the permanent and short term fiber strain on both 100 kpsi and 200 kpsi fiber for select permanent and short term tensile loads. FIG. 5 is a chart showing performance of fibers having various levels of proof test under different levels of applied stress. FIG. 5 demonstrates that a 200 kpsi fiber can achieve the required 20 year reliability with a short term strain of 1.25% and a long term strain of 0.3%.

FIG. 6 illustrates a series of example cables wherein the cable 10 was optimized for tensile performance using 100 kpsi fibers and a variety of different aramid types for the aramid layer 30. As shown in FIG. 6, only the aramid K49 variety of examples 1 and 3 in the table of FIG. 6 pass the acidity rating desired as measured under EN 50267-2-3. However, the calculations for the residual load and short load are not optimal. FIG. 7 illustrates a series of example cables wherein the cable 10 was optimized for acidity rating using 100 kpsi fibers and a variety of different aramid types, in which the cables meet the acidity rating desired and all but examples 1 and 3 still fall short of the desired 200 N short term tensile load requirement. FIG. 8 illustrates a series of example cables in wherein each cable 10 was optimized with 200 kpsi fiber and reduced aramid. As shown in FIG. 8, all example cables with this configuration of components and materials meets the a1 acidity burn rating as well as far exceeding the short term tensile loading test of 200 N.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber jumper cable comprising:
   an outer jacket having an outer surface defining an outermost surface of the optical fiber cable and an inner surface defining a central bore;
   a plurality of aramid fibers located in the central bore, wherein the plurality of aramid fibers has a total linear density such that the optical fiber jumper cable has an a1 acidity rating during burn as measured by EN 50267-2-3;
   at least one optical fiber located within the central bore and surrounded by the aramid fibers, wherein the at least one optical fiber satisfies a proof test of 200 kpsi or greater and experiences less than or equal to 0.5% permanent fiber strain when exposed to a permanent tensile load of 100 N; and
   at least one connector on an end of the optical fiber jumper cable.

2. The optical fiber jumper cable of claim 1, wherein the at least one optical fiber experiences less than or equal to 1.3% non-permanent fiber strain when exposed to a short term tensile load of 400 N.

3. The optical fiber jumper cable of claim 2, wherein the non-permanent fiber strain is between 1.20% and 1.30%.

4. The optical fiber jumper cable of claim 1, wherein the total linear density of the plurality of aramid fibers is less than 10,000 dtex.

5. The optical fiber jumper cable of claim 4, wherein the total linear density of the plurality of aramid fibers is between 4500 dtex and 5500 dtex.

6. The optical fiber jumper cable of claim 1, wherein the optical fiber jumper cable has a cable outside diameter of between 1.0 and 3.0 millimeters.

7. The optical fiber jumper cable of claim 6, wherein the cable outside diameter is between 1.2 and 2.8 millimeters.

8. The optical fiber jumper cable of claim 1, wherein there are no non-aramid strength members located within the central bore of the outer jacket or embedded within the outer jacket.

9. The optical fiber jumper cable of claim 1, wherein the optical fiber jumper cable has a conductivity of less than 2.5 uS/mm.

10. The optical fiber jumper cable of claim 1, wherein the outer jacket comprises a thermoplastic material that is polyolefin-based.

11. The optical fiber jumper cable of claim 10, wherein the outer jacket further comprises a flame retardant additive.

12. The optical fiber jumper cable of claim 11, wherein the flame retardant additive is selected from a group that includes aluminum trihydrate (ATH), magnesium hydroxide (MDH), ammonium polyphosphate (APP), pentaerythritol (PER), antimony oxides, zinc borates, boehmite, intumescent materials, and red phosphorous.

13. The optical fiber jumper cable of claim 1, wherein the outer jacket is comprised of a polymer material that is a fire-resistant material.

14. The optical fiber jumper cable of claim 13, wherein the fire-resistant material has a LOI greater than 48 and/or a specific gravity greater than 1.55.

15. The optical fiber jumper cable of claim 1, wherein the at least one connector is an LC connector or an SC connector.

* * * * *